United States Patent
Ré et al.

(10) Patent No.: US 6,904,864 B2
(45) Date of Patent: Jun. 14, 2005

(54) CONTROLLED LIFEBOAT DEPLOYER

(75) Inventors: Antonio Simões Ré, St. John's (CA); Terry Finch, Paradise (CA); Brian J. Vietch, St. John's (CA); Gregory Janes, Paradise (CA); Michael Sullivan, St. John's (CA); Edward Kennedy, Trepassey (CA)

(73) Assignees: National Research Council of Canada, Ottawa (CA); Genesis Group Inc., St. John's Newfoundland (CA)

( * ) Notice: Subject to any disclaimer, the term of this patent is extended or adjusted under 35 U.S.C. 154(b) by 0 days.

(21) Appl. No.: 10/369,536

(22) Filed: Feb. 21, 2003

(65) Prior Publication Data
US 2003/0221605 A1 Dec. 4, 2003

Related U.S. Application Data
(60) Provisional application No. 60/358,347, filed on Feb. 22, 2002.

(51) Int. Cl.[7] .............................................. B63B 23/02
(52) U.S. Cl. ....................................... 114/368; 114/378
(58) Field of Search ................................ 114/365, 366, 114/368, 369, 378; 254/272, 273; 73/170.29, 170.31

(56) References Cited
U.S. PATENT DOCUMENTS

| | | | | |
|---|---|---|---|---|
| 3,109,185 A | * | 11/1963 | Miller ......................... | 114/368 |
| 4,000,646 A | * | 1/1977 | Mott et al. ................ | 73/170.31 |
| 4,928,925 A | * | 5/1990 | Christison .................... | 254/272 |
| 4,986,121 A | * | 1/1991 | Luscombe ................ | 73/170.29 |
| 5,706,755 A | * | 1/1998 | O'Brien ....................... | 114/365 |
| 5,970,906 A | * | 10/1999 | Hrescak et al. ............. | 114/378 |

FOREIGN PATENT DOCUMENTS

| | | |
|---|---|---|
| EP | 0 548 258 | 4/1995 |
| JP | 60025875 | 2/1985 |
| JP | 10325720 | 12/1998 |
| JP | 11295066 | 10/1999 |
| JP | 2001133548 | 5/2001 |

OTHER PUBLICATIONS

J.K. Nelson et al., "Effects of CG Location on the Launch Behavior of Free–Fall Lifeboats", Journal of Offshore Mechanics and Arctic Engineering, May 1995, vol. 117, pp. 133–135.

M. Arai et al., "Water Entry Simulation of Free–fall Lifeboat", Journal of The Society of Naval Architects of Japan, vol. 178, pp. 193–200.

Z. Wisniewski, "Experimental verification of the mathematical model of free–fall lifeboat launching kinematics", Computational Methods and Experimental Measures, pp. 555–564.

* cited by examiner

Primary Examiner—Lars A. Olson
(74) Attorney, Agent, or Firm—L. Anne Kinsman; Borden Ladner Gervais LLP

(57) ABSTRACT

A control system to control the descent of a seafaring vessel, such as a lifeboat, into water is disclosed herein. The control system, and an accompanying method, control the descent speed of the seafaring vessel to minimise the possibility of setback after splashdown, and thus increase the probability of a safe and orderly launch.

19 Claims, 4 Drawing Sheets

CONTROLLED LIFEBOAT DEPLOYER

This application claims the benefit of priority from U.S. Provisional Application Ser. No. 60/358,347, filed Feb. 22, 2002.

FIELD OF THE INVENTION

The present invention relates generally to a method and system for deploying seafaring vessels. More particularly, the present invention relates to a method and system for deploying lifeboats and other emergency craft to minimise launching difficulty due to waves.

BACKGROUND OF THE INVENTION

For both seafaring vessels, and fixed position marine based stations, such as offshore installations, the provision of emergency escape vessels, such as lifeboats, is essential. These emergency escape vehicles provide the crew with an escape route in the event of an emergency.

During marine accidents several factors affect the success of evacuation from the installation or ship: the ability of personnel to successfully board the life craft, the ability of personnel to successfully launch the life craft and clear the hazardous area; the ocean and weather conditions during deployment; and the retrieval of the life craft from the ocean. Sometimes, personnel are unable to board the life craft due to the damaged condition of the offshore installation or ship. If personnel do successfully board the life craft they still face the daunting task of launching it. Weather conditions may interfere with, or even prevent launching. If the ocean waves are high, the life craft may be thrown backwards when it touches down on the ocean surface. This action of throwing the lifeboat backward, termed "setback", may cause the life craft to collide with the offshore installation or ship and injure or kill those on board.

During the deployment of such vehicles, the speed of the descent is controlled to provide an orderly splashdown, simply dropping a loaded life craft from a height is known to be an unacceptable life craft deployment strategy. Typically, life craft are lowered into the water using a hoist, a winch, or other such equipment. Life craft deployment systems are well known in the art, and typically include a controllable motor for raising and lowering the life craft. One of the other benefits of the use of a motorized hoist is that the placement of the life craft is controlled so that a large number of life craft are not deployed in the same area causing congestion and making an orderly escape difficult.

Present evacuation systems lower or drop the life craft into the ocean from the offshore installation or ship at a fixed descent speed. No control is exercised over the drop point target in terms of its position relative to a wave profile. Likewise, the launch of a fast rescue craft is not controlled in terms of its position on a wave profile. Timing a launch is left to the judgement of the coxswain or pilot. One such lifeboat launching system is known as the twin falls davit launch system. This system lowers the lifeboat from a fixed position on the deck of a platform at a fixed rate using cables connected to the bow and the stem of the lifeboat.

During the deployment of a life craft both the wind and the waves on the water surface are a critical factor in ensuring a safe escape. In many instances, the waves and wind are known to push life craft back towards the launching vessel or station, which is highly undesirable. It is known in the art that the initial launch velocity, and the ability of the life craft to provide acceleration away from the launch site is crucial to ensuring a safe launch. The initial headway of the life craft is an important factor in its ability to escape and clear the offshore installation or ship.

Life craft are typically restricted in size for storage reasons, and thus their ability to hold a powerful motor is limited. Thus the ability of the life craft to overcome the effects of wind and waves purely through the power of an onboard motor is limited. As a result there is a need for a life craft launching system that provides an optimal launch location for a life craft so that it can make an improved escape.

SUMMARY OF THE INVENTION

It is an object of the present invention to obviate or mitigate at least one disadvantage of previous seafaring vessel deployment systems.

The present invention provides a system for providing an advantageous launch position for a life craft so that it is able to vacate the immediate vicinity of an offshore installation or ship by using the characteristics of the ocean surface. The present invention minimises wave set back uses the surface of the ocean to give the life craft initial momentum in the direction away from the offshore installation or ship. These features reduce the likelihood of collisions between the life craft and the offshore installation or ship.

In a first aspect of the present invention, there is provided a seafaring vessel deployment system for lowering a seafaring vessel into water for launching. The deployment system comprises a wave sensor, a vessel deployer and a deployment control system. The wave sensor is for sensing wave characteristics of incoming waves. The vessel deployer is for deploying the seafaring vessel into the water. The a deployment control system is for receiving sensed wave characteristics from the wave sensor and for controlling vessel deployer to deploy the seafaring vessel into the water by determining a desired launch position for the seafaring vessel on an incoming wave and initiating the deployment to cause the seafaring vessel to splashdown at the desired launch position.

In an embodiment of the first aspect of the present invention, the seafaring vessel is a life boat. In another embodiment of the present invention, the wave sensor includes a radar based sensing system for obtaining real time three dimensional images of the water and also includes a comparator, operatively connected to the sensing system, for comparing two obtained images of the water and deriving wave characteristics from the comparison. In another embodiment of the present invention the sensed characteristics include the phase of the incoming waves, the speed of the incoming waves and the height of the incoming waves. In yet another embodiment of the first aspect of the present invention the deployer includes a hoist having a controllable motor for lowering the seafaring vessel into the water at a controlled speed. In another embodiment, the deployment control system includes a launch position determination system for receiving the sensed characteristics, and determining a desired launch position on an incoming wave based on wave speed and wave height, where the desired launch position is either the crest of a wave, or between the crest of a wave and the ensuing trough. This region is commonly referred to as the down slope of a wave. In a further embodiment the deployment control system includes communications means for providing the seafaring vessel a desired launch speed derived from the received characteristics.

In a second aspect of the present invention, there is provided a method of deploying a seafaring vessel using seafaring vehicle deployer. The method comprises four steps. The first step is obtaining characteristics of incoming waves. The second step is determining, from the obtained characteristics, a desired launch position. The third step is determining the time before the desired launch position is below the vessel, and the fourth step is deploying the vessel to splashdown at the desired launch position.

In an embodiment of the second aspect of the present invention, the characteristics include wave height, wave speed, and wave phase and the desired launch position is between the crest of first a wave and the trough between the first and a second wave. In a further embodiment, the step of deploying includes releasing the seafaring vessel to slide down a ramp into the water.

In a third aspect of the present invention, there is provided a deployment controller for receiving wave characteristics from a wave sensor and for controlling a deployer to deploy a sea faring vessel at a desired launch position. The controller comprises a sensor, a deployer interface, a launch position determination system and a deployer controller. The sensor input is for receiving the wave characteristics. The deployer interface is for receiving from the deployer vessel height information. The launch position determination system is for determining from the received wave characteristics the desired launch position. The deployer controller is for determining the time at which the deployment of the vessel should commence based on the vessel height information and the received wave characteristics.

In an embodiment of the present invention, the received wave characteristics include wave height and speed and the deployer controller includes a launch delay calculator for calculating a launch delay based on the wave speed and vessel height, and wherein the deployer interface initiates deployment upon expiry of the calculated launch delay.

Other aspects and features of the present invention will become apparent to those ordinarily skilled in the art upon review of the following description of specific embodiments of the invention in conjunction with the accompanying figures.

DESCRIPTION OF THE DRAWINGS

Embodiments of the present invention will now be described, by way of example only, with reference to the attached Figures, wherein.

DETAILED DESCRIPTION

Generally, the present invention provides a method and system for determining a desired launch position on an incoming wave and for lowering the seafaring vessel to the desired launch position.

It has been observed that the ability of a life craft to successfully launch is dependent upon a number of factors including the position on a wave at which the launch is stared. Not every position is considered to be beneficial. At the top, or crest, of a wave the life craft is able to effectively slide down the surface of the wave towards the trough of the wave, and thus build up escape velocity. If a life craft is deployed at the trough between two waves it is immediately met with an upslope of water and is pushed backwards. Thus to avoid setback it is advantageous to launch the life craft in the desired launch position, which is ideally at the crest of wave, but can also be in the region between the wave crest and the ensuing trough.

Based on this understanding of the desired launch position, it is clearly beneficial to improve launch and evacuation performance by controlling the lowering speed and drop point so that the life craft is dropped on a more favourable wave profile location. Wave sensing instrumentation is required for such a system, and this instrumentation should preferably provide the necessary information to the launch controller so that the splash down can be appropriately timed.

Figure 1:
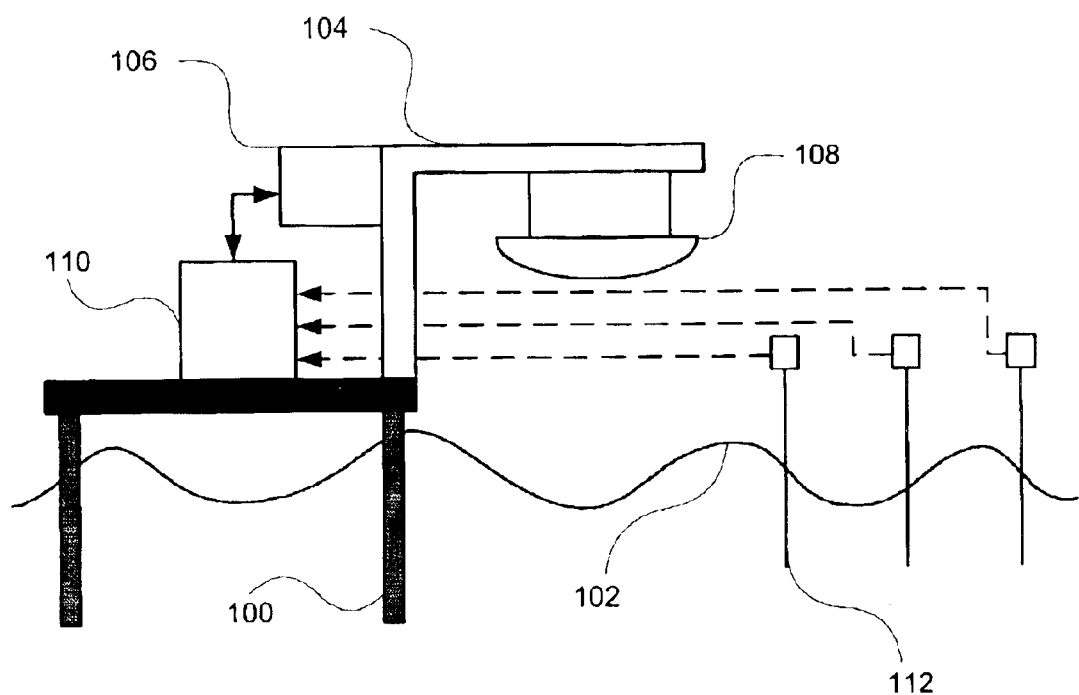
FIG. 1 is an illustration of a system of the present invention.

FIG. 1 illustrates a possible application of the present invention to an existing deployment system, for deploying a life craft at a desired position on an incoming wave. Platform 100, is a stationary offshore platform surrounded by waves 102. Through illustrated here as a stationary platform, one skilled in the art will appreciate that the launching platform could also be a seafaring vessel. On platform 100 is hoist 104, with winch 106. It should be noted that though described here as hoist 104 having winch 106, a variety of other deployment systems can be used in its place, as will be described below. Hoist 104 is used to hold seafaring vessel 108, also referred to as either life craft or lifeboat 108. Winch 106 is used to control the descent of vessel 108, so that an orderly splashdown is achieved. Winch 106 is controlled by deployment control system 110, which controls the rate at which winch 106 allows vessel 108 to descend, and receives from winch 106 information about the distance between vessel 108 and a reference position, such as the base of the platform. Deployment control system 110 receives information relating to the characteristics of incoming waves 102 from wave sensors 112. Wave sensors 112 are used to collect information about waves 102, including, for example, their height, speed and phase. A number of known technologies can be employed in the design of wave sensors 112 including wave staffs, wave buoys, and remote sensing using radar, lasers, and optics. Wave staffs are basically large-scale waveprobes. The staff is usually over 3 m in length and extends from the deck of a platform, into the ocean. Wave staffs can give an accurate wave profile but are only able to measure a small area of the ocean surface at once and are prone to biofouling. Wave buoys are floating devices that ride the surface of waves and are able to provide a wave profile from collected acceleration data. Again wave buoys are unable to provide wave data on large areas of the ocean and are thus limited in use. Remote sensing provides a preferred solution to the limitations of the previously mentioned systems. The use of radar to scan the ocean's surface has been developed over the last few decades. Units are available to scan a 100 $m^2$ area of the ocean, and provide a surface map including wave heights and direction of wave travel. Such a system can be mounted onto the lifeboat, or atop the hoist, and provide a surface map of the ocean, from which safe launch areas can be located. In one implementation of the present invention, remote imaging is employed to obtain a series of images of the surface 102. A pair of images are then compared to each other using a comparator to derive the wave characteristics used to determine the desired launch position.

In place of the combination of winch 106 and hoist 104, alternate deployment systems, including freefall systems that deploy seafaring vessels to slide down ramps and systems that suspend the vessels small distances from the water surface and then release them into a short period of free fall. With these systems, no lowering speed is computed, and instead a determination of how long the deployment process takes is used in the calculation to determine a launch delay. At the expiry of the launch delay, the deployment system releases the vessel, which then splashes down at the desired launch location.

Figure 2:
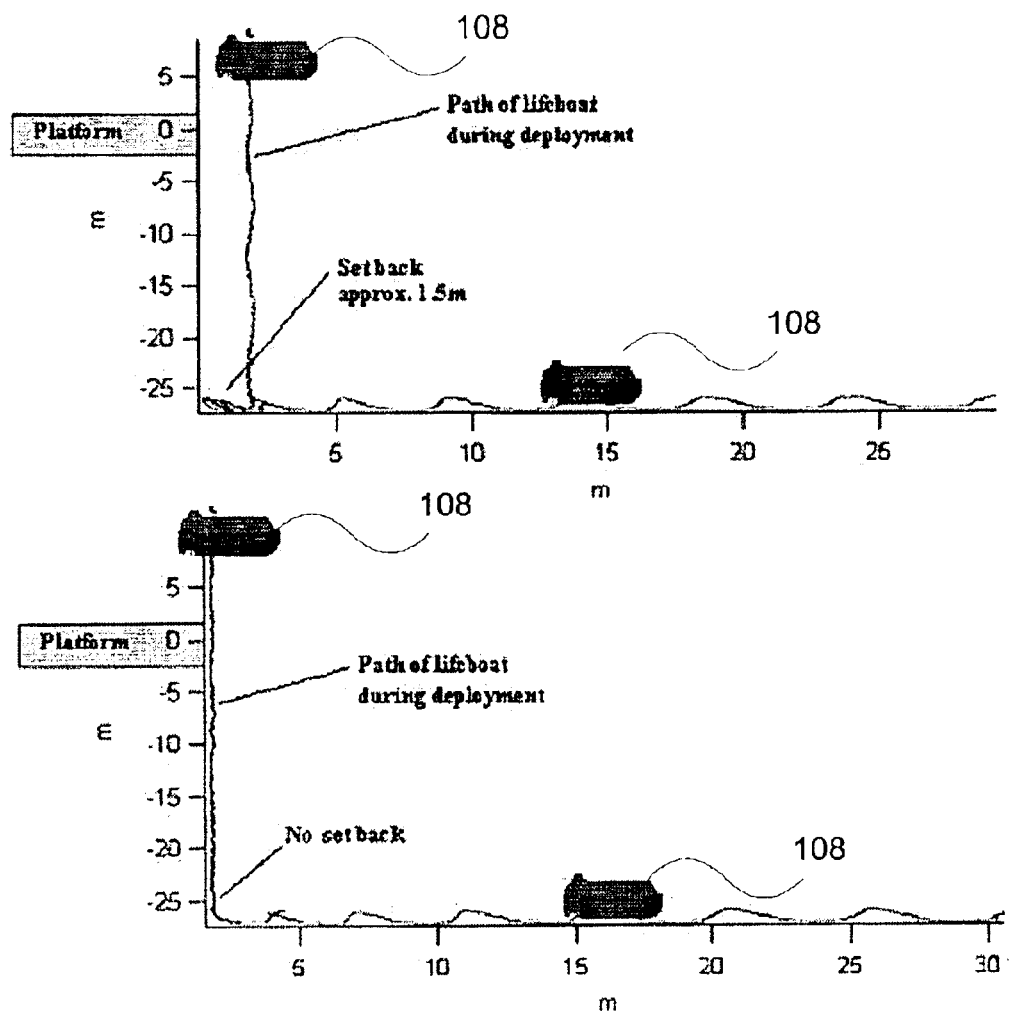
FIG. 2 is an illustration of the path of a life craft during deployment.

The results of testing lifeboat deployment show that when a lifeboat lands on the upslope or trough area of the wave, it tends to get pushed back. The setback can be sufficient to cause a collision with the platform. Results also show that when the lifeboat lands on the crest or downslope of a wave there is little or no setback, and the lifeboat can safely escape from the general vicinity of the platform quickly. These two scenarios are illustrated in FIG. 2 for a conventional davit launch deployment system. In the top portion of FIG. 2, life craft 108 is deployed in the trough between waves and experiences a setback of approximately 1.5 m, while the lower portion of FIG. 2 illustrates the path of life craft 108 when it is deployed at the crest of wave. In the second scenario there is substantially no setback.

On the upslope of the wave, the energy of the wave is transferred to the lifeboat causing the lifeboat to be pushed in the direction of movement of the wave. It is this energy transfer that forces the lifeboat backward and into the platform. On the downslope the lifeboat actually slides down the wave in the direction of the trough, thus moving away from the platform. A control system that allows controlled wave phase deployments improves evacuation system performance.

Based on the variables described above, the deployment control system calculates a "Time to Lower": the time taken for the lifeboat to lower from the stowed position to the surface of the water at the crest of the selected wave. The Time to Lower is calculated as:

Time to Lower=(−(Stowed Position))/(Launch Velocity)+(Still Water Line Position)/(Launch Velocity)+(Embark Wait Time)−(cos(Target Phase))*(Wave Height)

Once the deployment system calculates the Time to Lower, it is used in conjunction with the Wave Period, and the Target Phase. Both the Wave Period and Target Phase value are computed using numerical methods that are known to those skilled in the art, and explained in greater detail below. The deployment control system then preferably performs a sequence of the following five steps in order to successfully launch the lifeboat on the correct phase of the wave. The five steps are:

1. Calculate the "Launch Delay" (how long until the launch process should start)
2. Sample data from the wave sensor for exactly one and a half Wave Periods.
3. Locate the position and time co-ordinates of the desired wave crest. The time co-ordinate of the peak is referred to as the "Peak Delay".
4. Delay for a time period equal to the Launch Delay and Peak Delay combined.
5. Pass control back to the deployment system.

The two key problems in the implementation of the system of the present invention for use in open water environments are the random nature of waves in the ocean and the sophisticated instruments required to accurately measure ocean wave characteristics in real time. Complex equipment is generally not considered to be reliable enough to be included in the design of an emergency evacuation system, as a result presently preferred embodiments of the present invention employ remote sensing technology for the wave sensors to overcome reliability issues in the present implementation of other technologies, such as biofouling and drifting away from the desired position.

Figure 3:
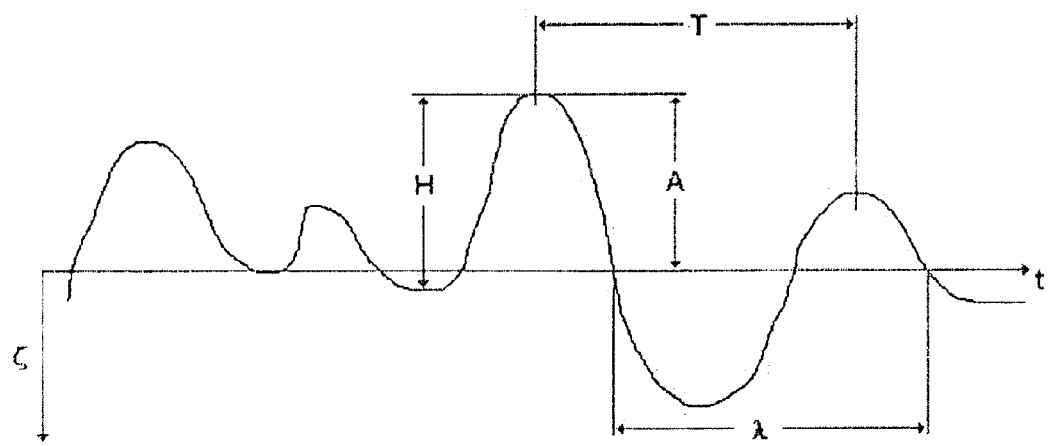
FIG. 3 is an illustration of the characteristics of waves.

With effective wave measurement techniques a wave profile that can provide the deployment control system with an adequate amount of information from which a desired launch position can be determined. As illustrated in FIG. 3, the important parameters of a wave are the wavelength (?), wave height (H), amplitude (A), period (T), surface depression (?), wave slope (a), speed or celerity (c), and significant wave height ($H_{1/3}$). A sample of a wave profile with some of the wave parameters is illustrated in FIG. 3.

One of the more important wave parameters is the significant wave height, which can be defined as the mean of the upper one third of the wave heights measured from a wave profile. Once a wave measurement system has collected a wave profile, it can then compute what is termed as the wave energy spectrum or simply wave spectrum. The wave spectrum is obtained by performing Fourier analysis on the wave profile data. The wave spectrum shows a distribution of energy versus frequency. The important aspect of a spectrum is that it can be used to obtain many of the wave parameters mentioned earlier in this section. For example, if you integrate the wave spectrum then the result is the significant wave height, $H_{1/3}$. Standard spectrums have been adopted to represent the average conditions of the ocean. The Bretschneider spectrum represents the typical wave spectrum of the open ocean and was adopted in 1957. The JONSWAP spectrum (JOint North Sea WAve Project) represents the typical wave spectrum in coastal waters. Wave spectra can be used to derive mathematically the aforementioned wave parameters.

Figure 4:
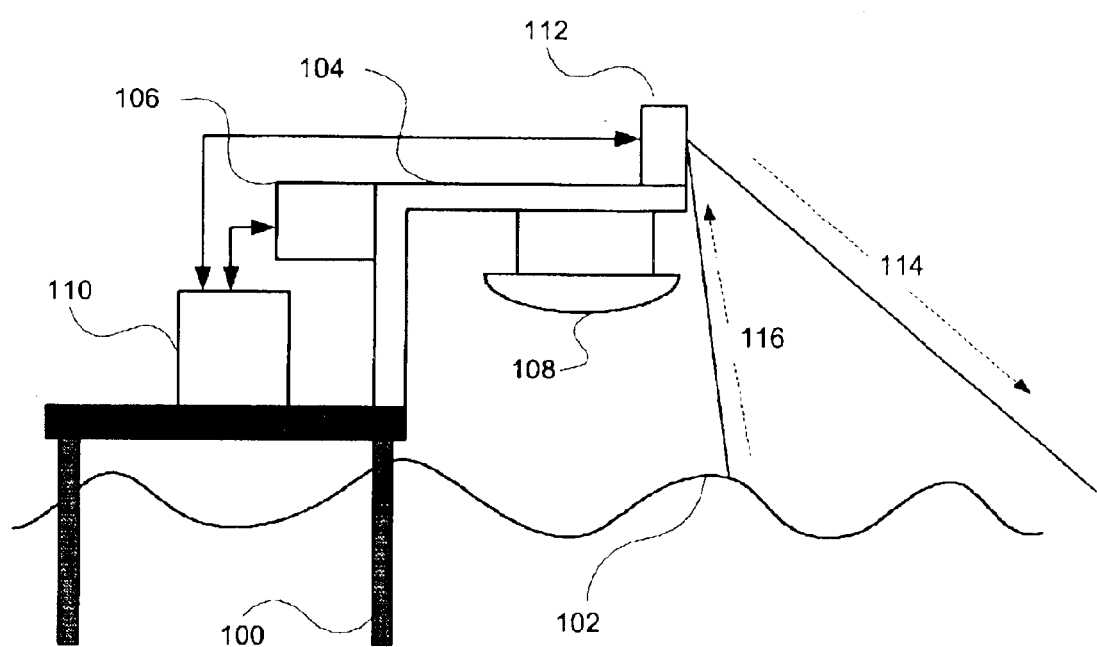
FIG. 4 is an illustration of a system of the present invention employing a remote sensing wave sensor.

FIG. 4 illustrates a presently preferred embodiment of the present invention. As in FIG. 1, platform 100 is surrounded by waves 102, and supports hoist 104, and hoist winch 106. Hoist winch 106 is used to lower vessel 108 into waves 102, and is controlled by deployment controller 110. Deployment controller 110 receives from winch 106 the height of vessel 108 with respect to either the hoist or the platform 100. Remote wave sensor 112 employs RADAR wave imaging the derive characteristics of incoming waves 102. Sensor 112 transmits RADAR waves 114 to the surface 102, and receives back reflected and scattered signal 116. From signal 116, sensor 112 is able to create an image of waves 102. By obtaining a series of images of waves 102 in this manner, sensor 112 is able to provide pairs of images to a comparator to determine the changes in the images, and from these changes is able to derive characteristics including the phase of individual waves, their heights, and their speed relative to the platform 100. These characteristics are then provided to deployment controller 110, which can select an incoming wave front, and based on its height, phase and speed, along with the height of vessel 108, can determine the speed at which winch 106 should lower vessel 108. It is well known to those skilled in the art of control systems how to implement a control system meeting these required characteristics. One skilled in the art will appreciate that the location of sensor 112 can vary, and need not be fixed atop the deployment system. In some embodiments, sensor 112 is mounted atop the vessel, and provides its information to controller 110 using a wireless communications channel.

Thus the present invention provides a system, and method, for deploying a seafaring vessel at a desired launch position on a wavefront. One skilled in the art will appreciate that the control system effectively selects a desirable incoming wavefront, determines its speed and its height, and from there calculates how long it will take to be under the life craft. This time determination is then used to determine the descent velocity of the life craft, as the control system can determine the vertical distance between the peak of the wave and the life craft. Further refinements to the system also include the inclusion of means to select, from the pool of detected waves, the wave whose crest will provide the best launch position based on any number of factors including the height and speed of subsequent waves. One skilled in the art will also appreciate that the control system can use the engine characteristics of the life craft as part of the decision process on which wave crest to select, and can conversely communicate to the life craft a minimum escape velocity to prevent setback.

One skilled in the art of control systems will appreciate that the control system of the present invention can be implemented as a computer program on a number of standard computing platforms such as personal computers with both random access memory systems and storage systems to archive data. Furthermore, the algorithms to determine the descent speed and select a desired launch position can be implemented as firmware on programmable single purpose computing systems to facilitate ease of deployment and a reduced space requirement. One skilled in the art will also appreciate that the controller can be implemented as a dedicated hardware solution. These above described embodiments should be understood to be exemplary in nature and are in no way to be interpreted as an exhaustive list of the possible embodiments of the present invention.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A seafaring vessel deployment system for lowering a seafaring vessel into water for launching, the deployment system comprising:
    a wave sensor for sensing wave characteristics of incoming waves;
    a vessel deployer, for deploying the seafaring vessel into the water; and
    a deployment control system for receiving sensed wave charateritics from the wave sensor and for controlling the vessel deployer to deploy the seafaring vessel into the water by determining a desired launch position for the seafaring vessel on an incoming wave and initiating the deployment to cause the seafaring vessel to splashdown at the desired launch position.

2. The deployment system of claim 1, wherein the seafaring vessel is a life boat.

3. The deployment system of claim 1, wherein the wave sensor includes a radar based sensing system for obtaining real time three dimensional images of the water.

4. The deployment system of claim 3, wherein the wave sensor further includes a comparator, operatively connected to the sensing system, for comparing two obtained images of the water and deriving wave characteristics from the comparison.

5. The deployment system of claim 1, wherein the sensed characteristics include the phase of the incoming waves.

6. The deployment system of claim 1, wherein the sensed characteristics include the speed of the incoming waves.

7. The deployment system of claim 1, wherein the sensed characteristics include the height of the incoming waves.

8. The deployment system of claim 1, wherein the deployer includes a hoist having a controllable motor for lowering the seafaring vessel into the water at a controlled speed.

9. The deployment system of claim 1, wherein the deployment control system includes a launch position determination system for receiving the sensed characteristics and determining a desired launch position on an incoming wave based on wave speed and wave height.

10. The deployment system of claim 9, wherein the desired launch position is the crest of a wave.

11. The deployment system of claim 9, wherein the desired launch position is between the crest of a wave and the ensuing trough.

12. The deployment system of claim 9, wherein the deployment control system includes communications means for providing the seafaring vessel a desired launch speed derived from the received characteristics.

13. A method of deploying a seafaring vessel using seafaring vehicle deployer, the method comprising:
    obtaining characteristics of incoming waves;
    determining, from the obtained characteristics, a desired launch position;
    determining the time before the desired launch position is below the vessel; and
    deploying the vessel to splashdown at the desired launch position.

14. The method of claim 13, wherein the characteristics include wave height, wave speed, and wave phase.

15. The method of claim 13, wherein the desired launch position is between the crest of first a wave and the trough between the first and a second wave.

16. The method of claim 13, wherein the step of deploying includes releasing the seafaring vessel to slide down a ramp into the water.

17. A deployment controller for receiving wave characteristics from a wave sensor and for controlling a deployer to deploy a sea faring vessel at a desired launch position, the controller comprising:
    a sensor input for receiving the wave characteristics;
    a deployer interface, for receiving from the deployer vessel height information;
    a launch position determination system, for determining from the received wave characteristics the desired launch position; and
    a deployer controller for determining the time at which the deployment of the vessel should commence based on the vessel height information and the received wave charateritics.

18. The controller of claim 17, wherein the received wave characteristics include wave height and speed.

19. The controller of claim 18, wherein the deployer controller includes a launch delay calculator for calculating a launch delay based on the wave speed and vessel height, and wherein the deployer interface initiates deployment upon expiry of the calculated launch delay.

* * * * *